United States Patent
Matsunaga et al.

(10) Patent No.: US 10,683,003 B2
(45) Date of Patent: Jun. 16, 2020

(54) FAILURE DETERMINATION DEVICE FOR HYBRID VEHICLE

(71) Applicant: MITSUBISHI JIDOSHA KOGYO KABUSHIKI KAISHA, Tokyo (JP)

(72) Inventors: Hideo Matsunaga, Tokyo (JP); Hisakazu Ikedaya, Tokyo (JP); Hitoshi Kamura, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/200,289

(22) Filed: Mar. 7, 2014

(65) Prior Publication Data
US 2014/0257611 A1    Sep. 11, 2014

(30) Foreign Application Priority Data
Mar. 8, 2013    (JP) .................... 2013-046525

(51) Int. Cl.
*B60W 20/50*    (2016.01)
*B60W 10/06*    (2006.01)
(Continued)

(52) U.S. Cl.
CPC ............ *B60W 20/50* (2013.01); *B60W 10/06* (2013.01); *B60W 10/08* (2013.01);
(Continued)

(58) Field of Classification Search
CPC .......... B60L 11/02; B60L 11/04; B60L 11/06; B60L 11/08; B60L 11/10; B60L 11/12; B60W 20/00–50
(Continued)

(56) References Cited

U.S. PATENT DOCUMENTS

2001/0039230 A1* 11/2001 Severinsky ............ B60H 1/004
  477/3
2008/0277176 A1* 11/2008 Akimoto .................... 180/65.4
(Continued)

FOREIGN PATENT DOCUMENTS

JP     2007290663 A   * 11/2007
JP     2011-194976 A     10/2011
(Continued)

OTHER PUBLICATIONS

Japanese Office Action, dated Oct. 5, 2016, for Japanese Patent Application No. 2013-046525, with an English machine translation.

*Primary Examiner* — Aaron L Troost
(74) *Attorney, Agent, or Firm* — Birch, Stewart, Kolasch & Birch, LLP

(57) ABSTRACT

In a hybrid vehicle that selects a series mode in which an engine drives a motor generator to generate electric power and a driving motor drives drive wheels, the series mode is suspended to temporarily stop fuel supply to the engine, and the motor generator forcedly drives the engine using electric power supplied from a driving battery to perform motoring, and failure determination of the O2 sensors is performed based on oxygen concentrations of an exhaust gas from the engine detected by a front O2 sensor and a rear O2 sensor when the fuel supply to the engine is stopped and when the fuel supply is restarted after finish of the motoring.

1 Claim, 4 Drawing Sheets

(51) Int. Cl.
*B60W 10/08* (2006.01)
*B60W 50/02* (2012.01)

(52) U.S. Cl.
CPC . *B60W 2050/0215* (2013.01); *B60W 2530/12* (2013.01); *Y02T 10/6286* (2013.01); *Y10S 903/93* (2013.01)

(58) Field of Classification Search
USPC .......................................................... 701/22
See application file for complete search history.

(56) References Cited

U.S. PATENT DOCUMENTS

| | | | | |
|---|---|---|---|---|
| 2008/0302087 | A1* | 12/2008 | Genslak | F01N 9/00 60/277 |
| 2010/0076635 | A1* | 3/2010 | Sugimoto | B60K 6/445 701/22 |
| 2011/0106411 | A1* | 5/2011 | Anilovich et al. | 701/109 |
| 2011/0120095 | A1* | 5/2011 | Wald | F01N 3/10 60/276 |
| 2013/0184907 | A1* | 7/2013 | Whitney | B60W 10/06 701/22 |
| 2013/0293007 | A1* | 11/2013 | Tagami | B60L 11/1816 307/10.1 |

FOREIGN PATENT DOCUMENTS

| | | |
|---|---|---|
| JP | 2012-183866 | 9/2012 |
| WO | WO 2012/055472 A1 * | 5/2012 |

\* cited by examiner

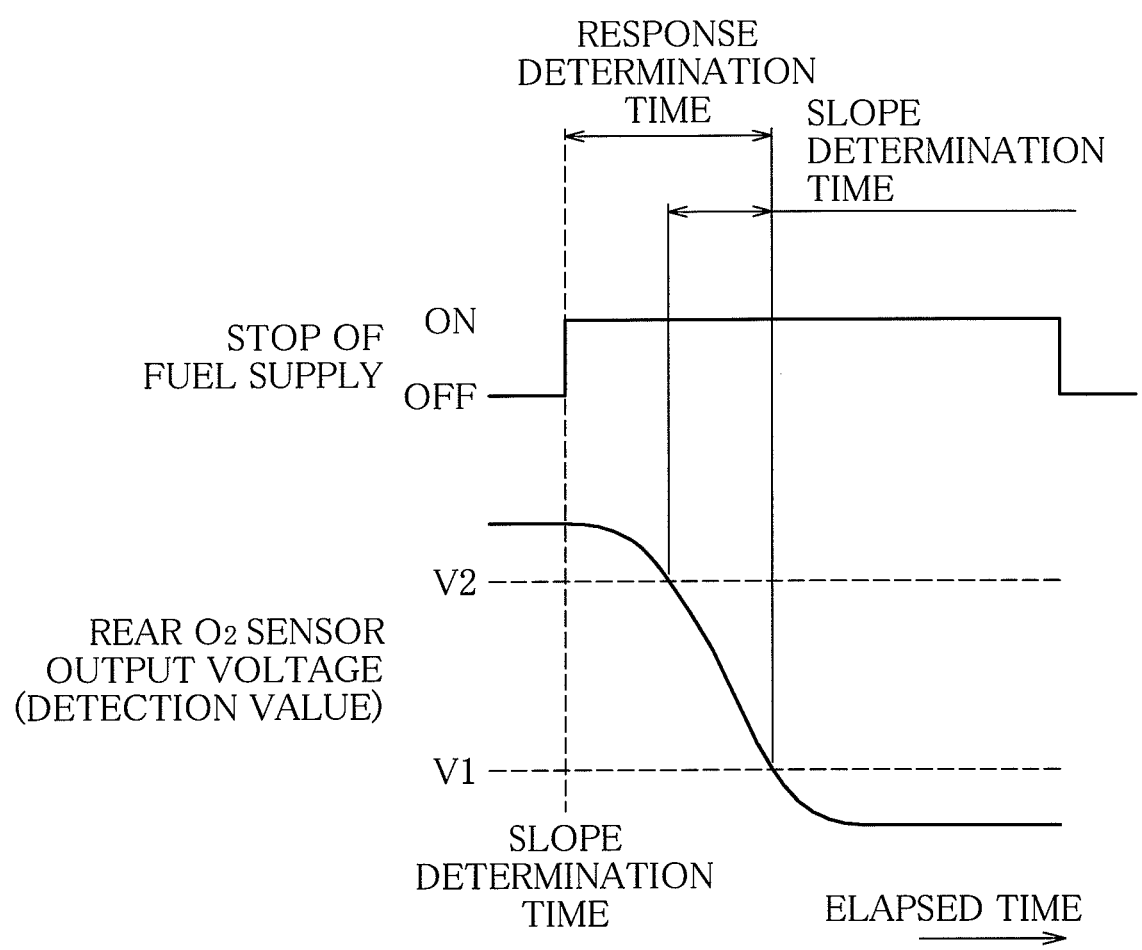

FAILURE DETERMINATION DEVICE FOR HYBRID VEHICLE

BACKGROUND OF THE INVENTION

Field of the Invention

The present invention relates to a technique of failure determination of a detection unit provided in an exhaust system of an engine of a hybrid vehicle.

Description of the Related Art

Among recently developed hybrid vehicles, a vehicle has been developed that allows a travel mode (series mode) in which an engine drives a motor generator to generate electric power and only an electric motor drives travel driving wheels.

Further, for the hybrid vehicle that allows the travel mode, a technique has been developed of performing failure determination of a detection unit (air-fuel ratio sensor, oxygen concentration sensor, catalyst monitor, or the like) in an exhaust system of an engine in the travel mode.

For example, Japanese Patent Laid-Open No. 2011-194976 discloses a technique of stopping fuel supply to an engine and forcedly driving the engine by a motor generator, and performing failure determination of a detection unit in each exhaust system based on a change in a detection value of the detection unit due to the stop of the fuel supply.

There are various failure determination methods of a detection unit in an exhaust system as described above. For example, the methods include a method for determining a failure from a detection value of a detection unit when fuel supply is stopped from a fuel supply state, or a method for determining a failure from a detection value of a detection unit when fuel is supplied from a fuel stop state. Also, a time required for failure determination of a detection unit may differ.

In the hybrid vehicle that allows the travel mode, it is required that various failure determination methods of a detection unit in an exhaust system can be widely performed in the travel mode.

SUMMARY OF THE INVENTION

The present invention is achieved to solve the problem described above, and has an object to provide a failure determination device for a hybrid vehicle that allows various failure determination methods of a detection unit in an exhaust system to be widely performed in a travel mode in which an engine drives a motor generator to generate electric power and only an electric motor drives travel driving wheels.

To achieve the object, the present invention provides a failure determination device for a hybrid vehicle, comprising: an engine included in the vehicle; a detection unit that detects an exhaust constituent of the engine; a motor generator that is driven by the engine to generate electric power, and drives the engine using electric power supplied from a driving battery included in the vehicle; a driving motor that drives drive wheels using electric power supplied from the driving battery; a mode selection unit that selects a first travel mode in which the engine drives the motor generator to generate electric power and the driving motor drives the drive wheels to cause the vehicle to travel; a motoring performing unit that suspends the first travel mode to temporarily stop fuel supply to the engine and forcedly drives the engine using the motor generator to perform motoring; and a unit for failure determination in travel mode that determines a failure of the detection unit based on a detection value of the detection unit when the fuel supply to the engine is stopped and a detection value of the detection unit when the fuel supply is restarted after finish of the motoring.

As such, the first travel mode is suspended to temporarily stop the fuel supply to the engine and the motor generator is driven to perform motoring, and the unit for failure determination in travel mode is provided that determines a failure of the detection unit based on the detection value of the detection unit when the fuel supply to the engine is stopped and the detection value of the detection unit when the fuel supply is restarted after finish of the motoring. Thus, both a failure determination method of a detection unit that allows determination when an exhaust gas changes from rich to lean, and a failure determination method of a detection unit that allows determination when the exhaust gas changes from lean to rich can be performed. This allows various failure determination methods of a detection unit to be widely performed in the first travel mode.

BRIEF DESCRIPTION OF THE DRAWINGS

The present invention will become more fully understood from the detailed description given hereinafter and the accompanying drawings which are given by way of illustration only, and thus, are not limitative of the present invention, and wherein:

FIG. 4 illustrates determination times for slope determination and response determination of a rear O2 sensor.

DETAILED DESCRIPTION OF THE INVENTION

Now, an embodiment of the present invention will be described with reference to the drawings.

Figure 1:
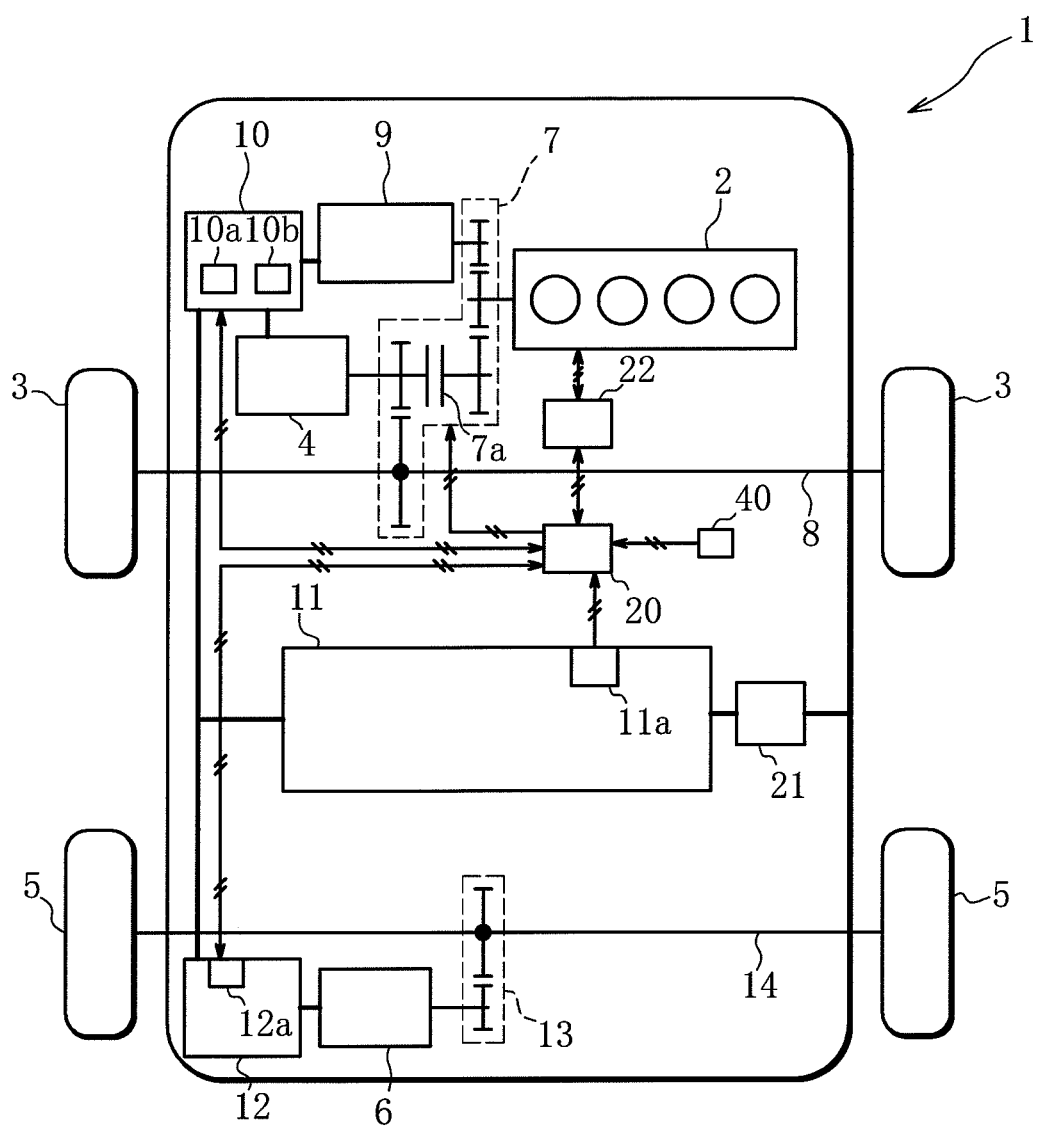
FIG. 1 is a schematic configuration diagram of a plug-in hybrid vehicle according to an embodiment of the present invention.

FIG. 1 is a schematic configuration diagram of a plug-in hybrid vehicle (hereinafter referred to as vehicle 1) according to an embodiment of the present invention.

The vehicle 1 of this embodiment is a four-wheel-drive vehicle that can travel by driving front wheels 3 using an output of an engine 2, and includes an electric front motor 4 (driving motor) that drives the front wheels 3, and an electric rear motor 6 (driving motor) that drives rear wheels 5.

The engine 2 can drive a drive axle 8 of the front wheels 3 via a reducer 7, and drive a motor generator 9 via the reducer 7 to generate electric power.

The front motor 4 is driven by electric power of a high voltage supplied from a driving battery 11 and the motor generator 9 included in the vehicle 1 via a front inverter 10 to drive the drive axle 8 of the front wheels 3 via the reducer 7. The reducer 7 includes a clutch 7a that can connect/disconnect transmission of power between an output shaft of the engine 2 and the drive axle 8 of the front wheels 3.

The rear motor 6 is driven by electric power of a high voltage supplied from the driving battery 11 and the motor generator 9 via a rear inverter 12 to drive a drive axle 14 of the rear wheels 5 via a reducer 13.

The electric power generated by the motor generator 9 can charge the driving battery 11 via the front inverter 10, and can be supplied to the front motor 4 and the rear motor 6.

The driving battery 11 includes a secondary battery such as a lithium-ion battery, has a battery module (not shown) including a plurality of battery cells together, and further includes a battery monitoring unit 11a that monitors a state of charge (SOC) and the like of the battery module.

The front inverter 10 includes a front motor control unit 10a and a generator control unit 10b. The front motor control unit 10a controls an output of the front motor 4 based on a control signal from a hybrid control unit 20 (mode selection unit). The generator control unit 10b has a function of controlling an amount of electric power generation of the motor generator 9 based on a control signal from the hybrid control unit 20.

The rear inverter 12 includes a rear motor control unit 12a. The rear motor control unit 12a has a function of controlling an output of the rear motor 6 based on a control signal from the hybrid control unit 20.

Further, the motor generator 9 can drive the engine 2 using electric power supplied from the driving battery 11 based on a control signal from the hybrid control unit 20, and has a function of a starter motor of the engine 2.

Also, the vehicle 1 includes a charger 21 that charges the driving battery 11 using an external power supply.

The hybrid control unit 20 is a control device for generally controlling the vehicle 1, and includes an input/output device, a storage device (ROM, RAM, nonvolatile RAM, or the like), a central processing unit (CPU), or the like.

To an input side of the hybrid control unit 20, the battery monitoring unit 11a of the driving battery 11, the front motor control unit 10a and the generator control unit 10b of the front inverter 10, the rear motor control unit 12a of the rear inverter 12, an engine control unit 22 (unit for failure determination before travel mode switching, unit for failure deterioration in travel mode), and an accelerator opening sensor 40 that detects an amount of accelerator operation are connected, and detection and actuation information from these instruments are input.

On the other hand, to an output side of the hybrid control unit 20, the front motor control unit 10a and the generator control unit 10b of the front inverter 10, the rear motor control unit 12a of the rear inverter 12, the reducer 7 (clutch 7a), and the engine control unit 22 are connected.

The hybrid control unit 20 calculates a vehicle request output P required for travel driving of the vehicle 1 based on various detection amounts and various kinds of actuation information described above from the accelerator opening sensor 40 or the like, sends a control signal to the engine control unit 22, the front motor control unit 10a, the generator control unit 10b, the rear motor control unit 12a, and the reducer 7, to control switching (selection) among travel modes (electric vehicle (EV) mode, series mode, and parallel mode), outputs of the engine 2, the front motor 4, and the rear motor 6, and an output (generated electric power) of the motor generator 9. The hybrid control unit 20 includes a motoring performing unit that forcedly operates the engine using the motor generator.

In the EV mode (second travel mode), the engine 2 is stopped, and the front motor 4 and the rear motor 6 are driven by electric power supplied from the driving battery 11 to cause the vehicle to travel.

In the series mode (first travel mode), the clutch 7a in the reducer 7 is disconnected, and the engine 2 actuates the motor generator 9. The front motor 4 and the rear motor 6 are driven by electric power generated by the motor generator 9 and electric power supplied from the driving battery 11 to cause the vehicle to travel. In the series mode, the rotational speed of the engine 2 is set to a predetermined rotational speed, and the surplus power is supplied to the driving battery 11 to charge the driving battery 11.

In the parallel mode, the clutch 7a in the reducer 7 is connected, and power is mechanically transmitted from the engine 2 via the reducer 7 to drive the front wheels 3. The front motor 4 and the rear motor 6 are driven by the electric power generated by the motor generator 9 actuated by the engine 2 and the electric power supplied from the driving battery 11 to cause the vehicle to travel.

The hybrid control unit 20 switches the travel mode to the parallel mode in a region with high efficiency of the engine 2, such as a high speed region. In regions other than the parallel mode, that is, middle and low speed regions, the travel mode is switched between the EV mode and the series mode based on the state of charge SOC of the driving battery 11.

Further, the hybrid control unit 20 has a function of forcedly driving the engine 2 to generate electric power and charge the driving battery 11 when the state of charge SOC of the driving battery 11 is lower than an allowable range.

Figure 2:
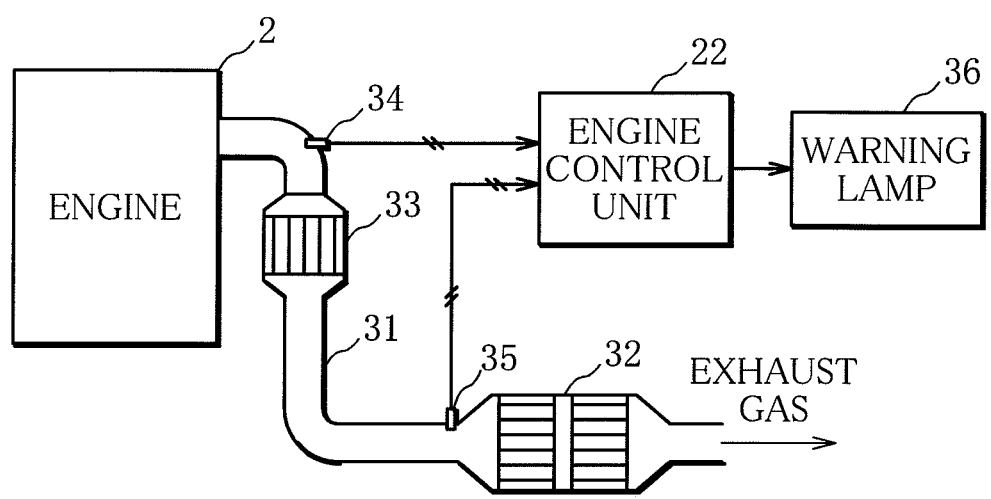
FIG. 2 is a schematic configuration diagram of an exhaust system of an engine according to this embodiment.

FIG. 2 is a schematic configuration diagram of an exhaust system of the engine 2.

As shown in FIG. 2, an exhaust passage 31 of the engine 2 in this embodiment includes a main exhaust gas purifying catalyst 32 and a warm-up exhaust gas purifying catalyst 33.

The main exhaust gas purifying catalyst 32 and the warm-up exhaust gas purifying catalyst 33 are catalysts for purifying an exhaust gas from the engine 2 such as a known three-way catalyst.

The main exhaust gas purifying catalyst 32 is a catalyst having a large capacity so as to mainly purify the exhaust gas, and for example, placed below a floor of the vehicle 1. The warm-up exhaust gas purifying catalyst 33 is a catalyst having a small capacity, and placed on an upstream side of the main exhaust gas purifying catalyst 32 and near the engine 2. The warm-up exhaust gas purifying catalyst 33 is quickly increased in temperature by the exhaust gas from the engine 2 when a temperature of the main exhaust gas purifying catalyst 32 is low at cold start of the engine 2, or the like, thereby ensuring exhaust gas purifying performance.

In the exhaust passage 31 between the engine 2 and the warm-up exhaust gas purifying catalyst 33, a front O2 sensor 34 (detection unit) that detects an oxygen concentration of the exhaust gas is provided. In the exhaust passage 31 between the warm-up exhaust gas purifying catalyst 33 and the main exhaust gas purifying catalyst 32, a rear O2 sensor 35 (detection unit, oxygen sensor) that detects an oxygen concentration of the exhaust gas is provided. The front O2 sensor 34 and the rear O2 sensor 35 may be air-fuel ratio sensors to detect air-fuel ratio.

The front O2 sensor 34 and the rear O2 sensor 35 output the respective detected oxygen concentrations as voltage values to the engine control unit 22. The engine control unit 22 is a control device for controlling the engine 2, and is configured to include an input/output device, a storage device (ROM, RAM, nonvolatile RAM, or the like), a central processing unit (CPU), or the like. In the engine control unit 22, these input detection values are used for controlling an air-fuel ratio of the engine 2.

Further, in this embodiment, the engine control unit 22 has a function of failure determination of the front O2 sensor 34 and the rear O2 sensor 35. When it is determined by the function of failure determination that either the front O2 sensor 34 or the rear O2 sensor 35 is in failure, a driver is informed of the determination by a warning lamp 36 provided on a driver's seat in the vehicle 1.

The failure determination of the front O2 sensor 34 and the rear O2 sensor 35 is performed when a rotation speed of a drive shaft of the engine 2 is a predetermined value or more and the fuel supply to the engine 2 is stopped, based on the detection values of the O2 sensors 34, caused by the stop of the fuel supply. In the parallel mode, the failure determination is performed at stop of fuel supply in deceleration of the vehicle. Further, in this embodiment, failure determination of the O2 sensors 34, can be performed also in the series mode.

The failure determination of the O2 sensors 34, 35 in the series mode is performed when the motoring performing unit performs motoring in which the motor generator 9 forcedly drives the engine 2 and fuel supply to the engine 2 is stopped. The failure determination can be performed in motoring before engine stop performed in shift from the series mode to the EV mode in which the engine 2 is stopped, and motoring during series performed by suspending the series mode. In the engine control unit 22, the failure determination performed in the motoring before engine stop corresponds to a unit for failure determination before travel mode switching in the present invention, and the failure determination performed in the motoring during series corresponds to a unit for failure determination in travel mode in the present invention.

Figure 3:
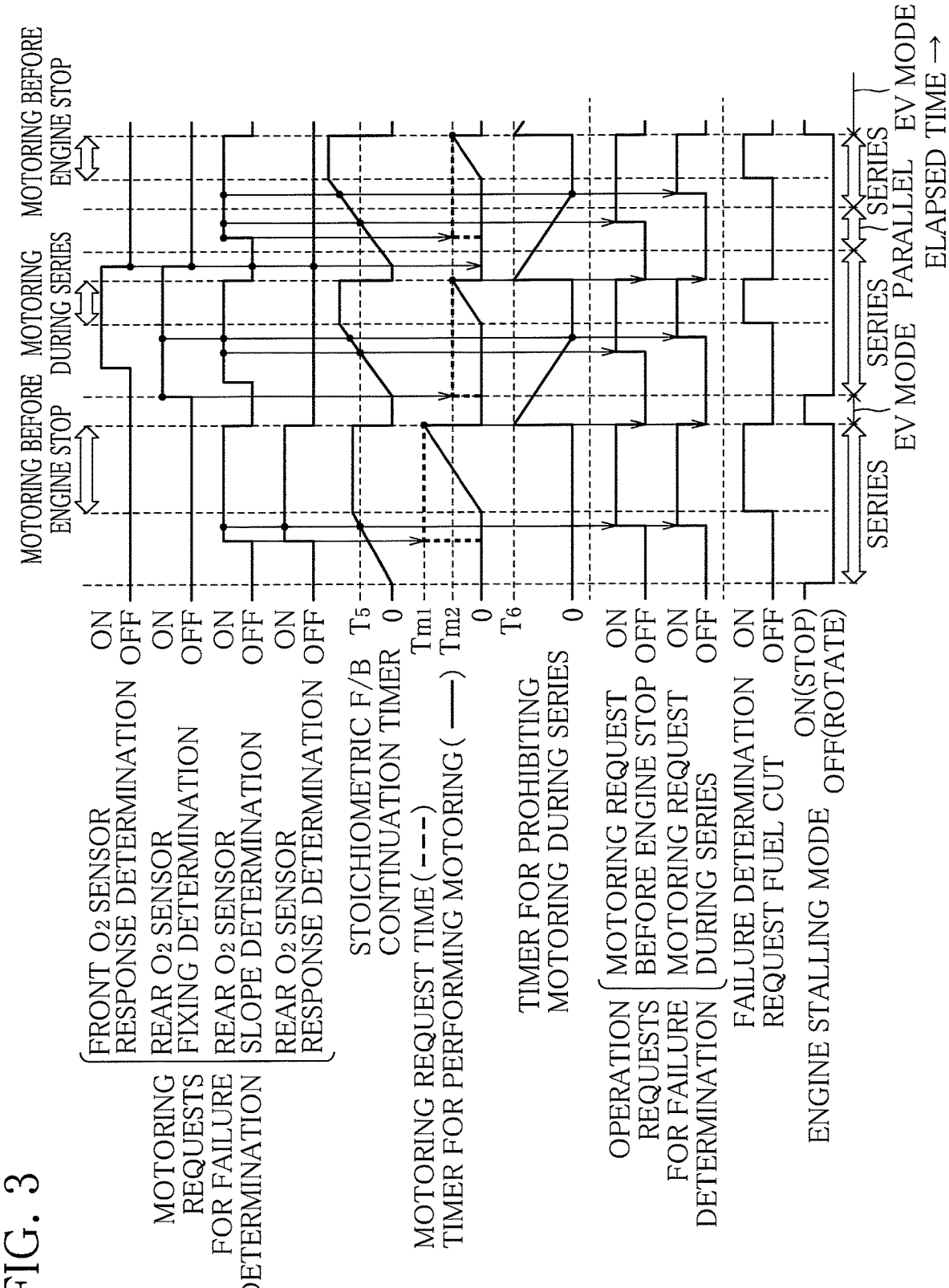
FIG. 3 is a timing chart showing an embodiment of control timings of various control signals in failure determination method in each motoring.

FIG. 3 is a timing chart showing an embodiment of control timings of various control signals in the failure determination method in each motoring. FIG. 4 illustrates determination times for slope determination and response determination of a rear O2 sensor 35.

In this embodiment shown in FIG. 3, request timings are shown of motoring and stop of fuel supply in the case where the travel mode is switched from the series mode to the EV mode, the series mode, the parallel mode, the series mode, and the EV mode in this order.

As shown in FIG. 3, motoring before engine stop is performed before switching from the series mode to the EV mode, in the next series mode, the series mode is suspended and motoring during series is performed, and the motoring before engine stop is again performed before switching from the next series mode to the EV mode.

In this embodiment, one kind of failure determination method is performed for the front O2 sensor 34, and three kinds of failure determination methods are performed for the rear O2 sensor 35 at two timings of the motoring before engine stop and motoring before engine stop. Specifically, front O2 sensor response determination is performed for the front O2 sensor 34. Rear O2 sensor fixing determination, rear O2 sensor slope determination, and rear O2 sensor response determination are performed for the rear O2 sensor 35.

The motoring requests for failure determination in FIG. 3 show request timings and times of motoring requested by the failure determination methods, and ON in FIG. 3 shows the motoring being requested.

Among the four kinds of failure determination methods described above, in the front O2 sensor response determination, a time for the detection value of the front O2 sensor 34 to change by a predetermined amount is measured both when an air-fuel ratio of an exhaust gas changes from rich to lean and when changes from lean to rich, whether the measured time is a threshold T1 or more is determined, and when the time is the threshold T1 or more, it is determined that responsiveness of the front O2 sensor 34 is abnormal.

In the rear O2 sensor fixing determination, a state in which the detection value of the rear O2 sensor 35 is fixed, that is, does not change at all is determined, and in the case where the detection value of the rear O2 sensor 35 does not change when an operation is performed such that the air-fuel ratio of the exhaust gas changes from rich to lean and from lean to rich, it is determined that the rear O2 sensor 35 is fixed and in failure.

In the rear O2 sensor slope determination, a rate of change of the detection value of the rear O2 sensor 35 is determined, and this determination is made when the air-fuel ratio of the exhaust gas changes from rich to lean. In this determination, a time for the detection value of the rear O2 sensor 35 to change by a predetermined amount of change in a middle region is measured, whether the measured time is a threshold T3 or more is determined, and when the time is the threshold T3 or more, it is determined that the rate of change of the rear O2 sensor 35 is abnormal.

In the rear O2 sensor response determination, a rate of change of the detection value including initial responsiveness of the rear O2 sensor 35 is determined, and this determination is also made when the air-fuel ratio of the exhaust gas changes from rich to lean. In this determination, a time for the detection value of the rear O2 sensor 35 to change from the stop of fuel supply to a predetermined value is measured, whether the measured time is a threshold T4 or less is determined, and when the time is more than the threshold T4, it is determined that the responsiveness of the rear O2 sensor 35 is abnormal.

In this embodiment, as shown in FIG. 4, the rear O2 sensor response determination is made from a time between the stop of the fuel supply and the rear O2 sensor 35 reaching an output value V1 close to 0, and the rear O2 sensor slope determination is made from a time between. V2 as an intermediate value of the output value and V1. Thus, the threshold T4 for the rear O2 sensor response determination is a longer time than the threshold T3 for the slope determination. Also, the threshold T1 for the front O2 sensor response determination is set to substantially the same time as the threshold T3 for the slope determination.

In FIG. 3, a stoichiometric F/B continuation timer is a timer that measures that a stoichiometric operation state continues for a predetermined time T5 in the engine 2 and the air-fuel ratio of the exhaust gas is stable. Measurement by the timer is started from start of the series mode or finish of the motoring during series, and the operation of the motoring is prohibited to restrict the failure determination until the predetermined time T5 has passed, thereby allowing accurate failure determination.

A motoring request time is required according to the motoring request of each failure determination method described above. Since the threshold T4 for the rear O2 sensor response determination is longer than the thresholds T1 to T3 for the other determinations as described above, the motoring request time is set to a long time Tm1 when the rear O2 sensor response determination is performed, and the motoring request time is set to a short time Tm2 when the failure determination method other than the rear O2 sensor response determination is performed.

A timer for performing motoring is a timer that sets a performing time of the motoring, measurement is started from start of the motoring, and the motoring is finished when the motoring request time (Tm1 or Tm2) has passed.

A timer for prohibiting motoring during series is a timer that starts measurement when the motoring is finished and prohibits the next motoring until the measurement has been performed for a predetermined time T6.

Operation requests for failure determination are motoring operation requests including a combination of the motoring requests described above under the condition of removal of the restrictions by the stoichiometric F/B continuation timer and the timer for prohibiting motoring during series.

Failure determination request fuel cut is ON between motoring request start timing input from the hybrid control unit 20 and the timer for performing motoring reaching the motoring request time (Tm1 or Tm2) to stop the fuel supply.

An engine stalling mode is ON when rotation of the drive shaft of the engine 2 is stopped, and OFF when the drive shaft is rotating.

As described above, in this embodiment, when the failure determination of the front O2 sensor 34 and the rear O2 sensor 35 is performed in the series mode, the failure determination can be performed both in the motoring before engine stop in switching from the series mode to the EV mode, and in the motoring during series, and the failure determination is performed in either motoring suitable for each failure determination method.

In the failure determination in the motoring during series, fuel supply to the engine 2 is stopped while the motoring in which the motor generator 9 forcedly drives the engine 2 is performed, a change from rich to lean of an oxygen concentration (or air-fuel ratio) of the exhaust gas is detected, and failure determination of the front O2 sensor 34 and the rear O2 sensor 35 is performed. Then, when the fuel supply to the engine 2 is restarted in recovery from the motoring to the series operation, a change from lean to rich of the oxygen concentration (or air-fuel ratio) of the exhaust gas is detected, and failure determination of the front O2 sensor 34 and the rear O2 sensor 35 is performed. Thus, in the failure determination in the motoring during series, ensuring the motoring time allows all the failure determination methods described above to be performed.

Also, in the failure determination in the motoring before engine stop, the slope determination and the response determination of the rear O2 sensor 35 can be performed that are failure determination methods that can be performed in the state where the air-fuel ratio of the exhaust gas changes from rich to lean.

In this embodiment, the front O2 sensor response determination that cannot be performed in the motoring before engine stop is performed in the motoring during series, and the rear O2 sensor slope determination and the rear O2 sensor response determination that can be performed both in the motoring before engine stop and in the motoring during series are performed in the motoring before engine stop in switching to the EV mode. Thus, in the motoring before engine stop, possible failure determination methods are maximally performed, while in the motoring during series, a failure determination method that cannot be performed in the motoring before engine stop is performed, thereby reducing the failure determination in the motoring during series. Thus, the failure determination in the motoring during series allows all the failure determination methods, while the failure determination in the motoring during series can be reduced. This can reduce a time for the motoring during series to restrict stop of the engine in the series mode, thereby reducing electric power generation loss.

In this embodiment, the motoring request for the rear O2 sensor slope determination is made in the motoring during series. This is because the motoring request for the front O2 sensor response determination that can be performed only in the motoring during series is also made at that time, and simultaneously performing the slope determination does not increase the motoring time. In the case where the failure determination method that can be performed only in the motoring during series is not requested, the rear O2 sensor slope determination may be restricted. This can reduce the motoring during series.

Also, in this embodiment, only the rear O2 sensor response determination requires a long motoring request time. This is because the threshold T4 is longer than the thresholds T1 to T3 for the other determination methods, and the rear O2 sensor response determination requires a long time as described above. In the case where a plurality of failure determination methods are requested in the motoring before each engine stop and the motoring during series, the longest motoring time is chosen to allow all the requested failure determination methods to be simultaneously performed, while restricting unnecessary extension of the motoring time when the failure determination is not required.

In this embodiment, the rear O2 sensor response determination is performed only before engine stop and not performed in the motoring during series. As such, the rear O2 sensor response determination that requires a long determination time and takes a predetermined time or more for the motoring is not performed in the motoring during series, thereby further reducing the time for the motoring during series.

The present invention is not limited to the above described embodiment. For example, the present invention may be applied to a determination method other than the failure determination method in the above described embodiment, for example, catalyst degradation determination using a detection value of the rear O2 sensor 35. The present invention may be also widely applied to a detection unit other than the front O2 sensor 34 and the rear O2 sensor 35, provided in the exhaust system of the engine 2.

Also in this embodiment, the present invention is applied to a plug-in hybrid vehicle that allows switching among the EV mode, the series mode, and the parallel mode, but may be widely applied to a hybrid vehicle that allows a travel mode in which at least an engine drives a motor generator to generate electric power, and only an electric motor drives travel drive wheels.

What is claimed is:
1. A failure determination device, having a processor, for a hybrid vehicle, comprising:
    an engine provided in a vehicle;
    a detection unit that detects an exhaust constituent of the engine;
    a motor generator that is driven by the engine to generate electric power, and drives the engine using electric power supplied from a driving battery included in the vehicle;
    a driving motor that drives drive wheels using electric power supplied from the driving battery;
    a clutch that is engaged or disengaged to transmit or cease to transmit power from the engine to the drive wheels;
    a mode selection unit, performed by the processor, that, under a predetermined condition, with the clutch disengaged, selects a first travel mode in which the engine drives the motor generator to generate electric power and the driving motor drives the drive wheels to cause the vehicle to travel;
    a motoring performing unit, performed by the processor, that, even under the predetermined condition, with the clutch disengaged, suspends the first travel mode to forcedly stop fuel supply to the engine and, while the drive wheels are driven by the driving motor, forcedly drives the engine using the motor generator to perform motoring, the motoring performing unit performing a motoring before engine stop mode performing motoring when traveling in the first travel mode until the first travel mode is switched to the engine stop mode in which the drive wheels are driven only by the driving motor, and a motoring during first travel mode performing motoring when traveling in the first travel mode and resumes to the first travel mode after the motoring; and a first unit, performed by the processor, for failure determination that determines a failure of the detection unit in the motoring before engine stop mode and the motoring during first travel mode based on a detected value of the detection unit, wherein the failure determination for the detection unit performed by the first unit includes a plurality of kinds of failure determinations requiring different determination times, and wherein the first unit performs one of the plurality of kinds of the failure determination simultaneously with another of the plurality of kinds of the failure determinations that requires a shorter determination time than the one failure determination, wherein the first unit performs the failure determination which requires the longest determination time only in the motoring before engine stop mode.

* * * * *